(12) United States Patent
Fujioka et al.

(10) Patent No.: US 7,602,461 B2
(45) Date of Patent: Oct. 13, 2009

(54) DIFFUSION REFLECTOR AND MANUFACTURE OF THE SAME

(75) Inventors: Takayuki Fujioka, Kanagawa (JP); Hideo Kataoka, Kanagawa (JP); Tetsuo Urabe, Kanagawa (JP)

(73) Assignee: Sony Corporation, Tokyo (JP)

( * ) Notice: Subject to any disclaimer, the term of this patent is extended or adjusted under 35 U.S.C. 154(b) by 1266 days.

(21) Appl. No.: 09/957,422

(22) Filed: Sep. 20, 2001

(65) Prior Publication Data
US 2006/0158583 A1    Jul. 20, 2006

Related U.S. Application Data

(62) Division of application No. 09/328,407, filed on Jun. 9, 1999, now Pat. No. 6,525,792.

(30) Foreign Application Priority Data
Jun. 19, 1998    (JP) .............................. P10-189654

(51) Int. Cl.
*G02F 1/1335* (2006.01)
*G02F 1/13* (2006.01)
(52) U.S. Cl. ...................... 349/113; 349/187
(58) Field of Classification Search ............... 349/113, 349/187
See application file for complete search history.

(56) References Cited

U.S. PATENT DOCUMENTS 5,847,789 A * 12/1998 Nakamura et al. ............ 349/99
5,936,688 A * 8/1999 Tsuda et al. ................. 349/113
6,094,252 A * 7/2000 Itoh et al. .................... 349/180

FOREIGN PATENT DOCUMENTS

| EP | 0 084 930 | 4/1986 |
| JP | 04-243226 | 8/1992 |
| JP | 06-167708 | 6/1994 |
| JP | 08-166605 | 6/1996 |
| JP | 10-153779 | 6/1998 |

OTHER PUBLICATIONS

Japanese Office Action dated May 30, 2008 for Application No. 10-189654.
Office Action for Japanese Application No. 10-189654 filed May 11, 2007.

* cited by examiner

*Primary Examiner*—David Nelms
*Assistant Examiner*—Nathanael R Briggs
(74) *Attorney, Agent, or Firm*—Sonnenschein Nath & Rosenthal LLP

(57) ABSTRACT

There is provided a method of manufacturing a diffusing reflector which assures high diffusion efficiency and excellent reflection characteristic for the lighting.

First, a resin film having photosensitivity is formed on a substrate 2. Next, gathering of pillar-shaped bodies isolated each other by the patterning of resin film with the photolithography is provided. Subsequently, the uneven surface layer having the maximum inclination angle under 12° is formed by gently deforming individual pillar-shaped bodies with the heat treatment. Moreover, the gently deformed uneven surface layer is coated with the resin and the flat openings between pillar-shaped bodies arranged discretely are buried to ease the inclination angle. Finally, a metal film 13 formed on the gently deformed uneven surface layer.

4 Claims, 8 Drawing Sheets

F I G. 4
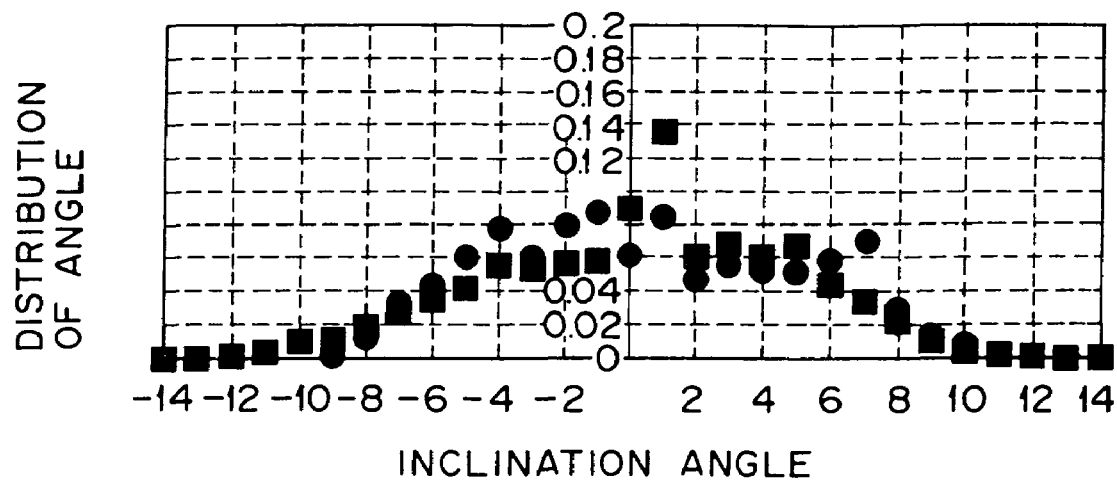
F I G. 5
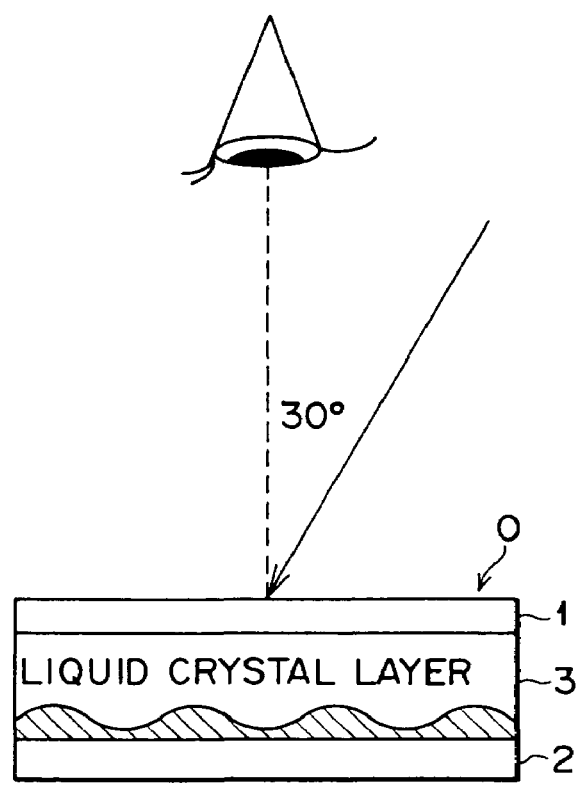

F I G. 10
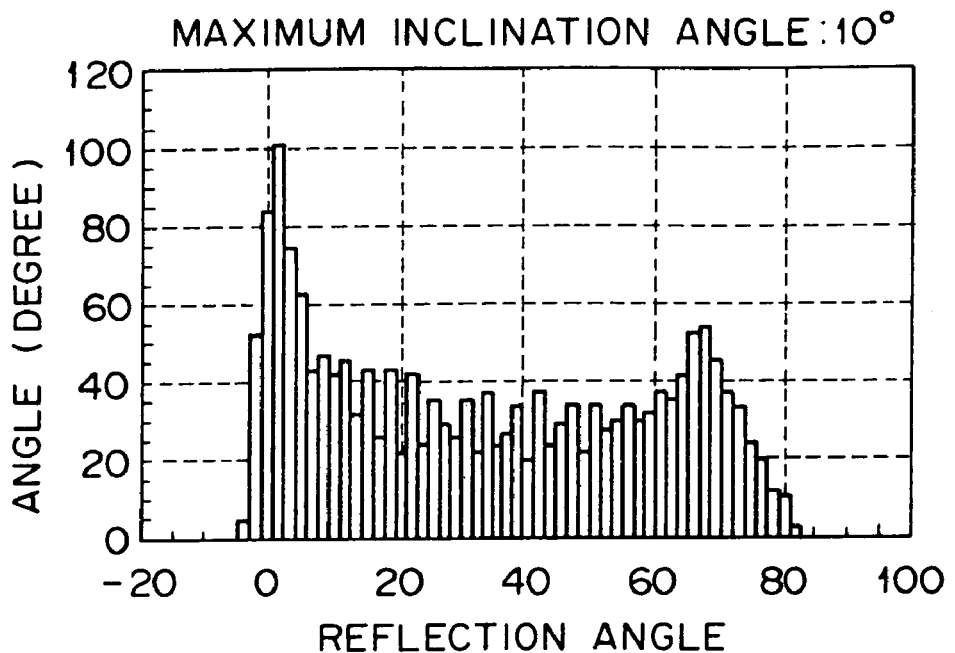
F I G. 11
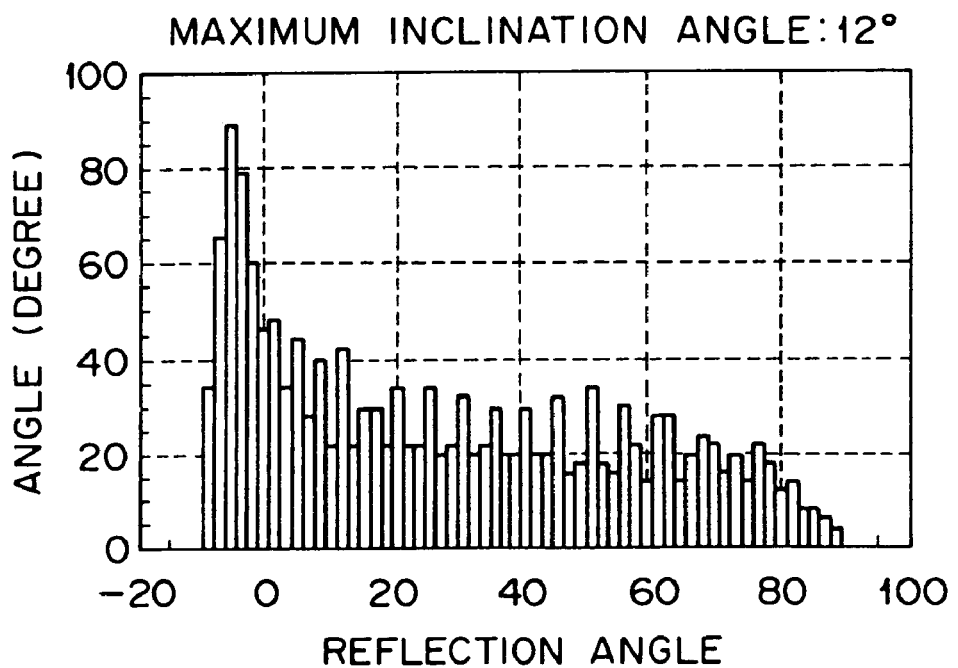

F I G. 13
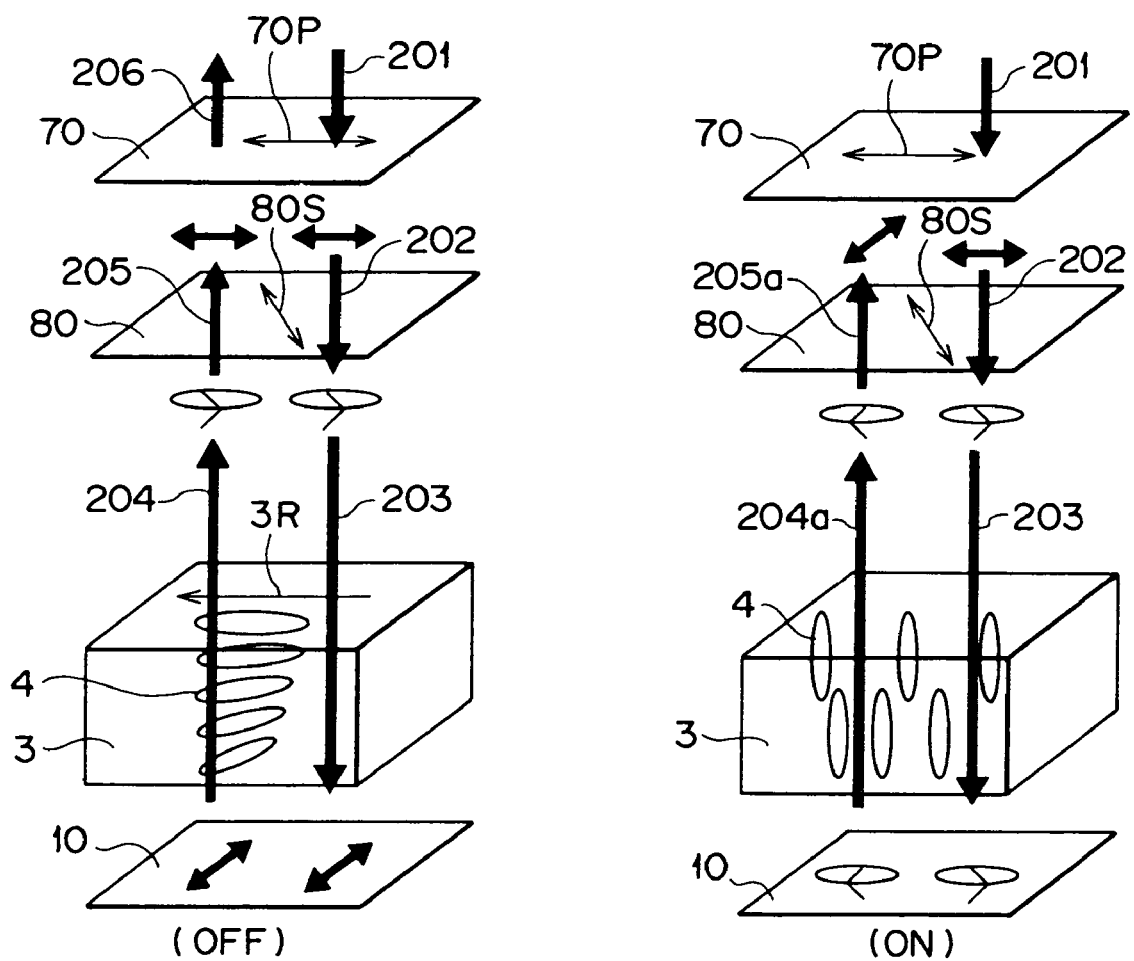

DIFFUSION REFLECTOR AND MANUFACTURE OF THE SAME

RELATED APPLICATION DATA

This application claims priority to Japanese Application No. P10-189654, filed Jun. 19, 1998, and is a divisional of U.S. application Ser. No. 09/328,407, filed Jun. 9, 1999 now U.S. Pat. No. 6,525,792, both of which are incorporated herein by reference to the extent permitted by law.

BACKGROUND OF THE INVENTION

1. Field of the Invention

The present invention relates to a diffusing reflector and method of manufacturing the same reflector and moreover a reflection type display apparatus utilizing the same diffusing reflector.

2. Description of Related Art

A display apparatus utilizing a liquid crystal as an electro-optical layer is formed in the flat-panel shape characterized in thin and light weight structure assuring low power consumption. Therefore, such display apparatus has been developed for wide application field such as a display of hand-held devices. An electro-optical substance such as liquid crystal is not self light generating type and displays an image by selectively transmitting or shielding the external light beam. Such passive type display apparatus can be classified into the transmission type and reflection type depending on the lighting system.

In the transmission type display apparatus, a panel holding liquid crystal, for example, as the electro-optical layer between a couple of transparent substrates is produced and a light source for lighting (backlight) is arranged at the rear surface of the panel and an image can be observed from the front side of panel. In the case of this transmission type, the backlight is essential and a fluorescent lamp, for example, is used as the light source. In the case of considering the display apparatus as a whole, since the backlight consumes the greater part of electrical power, it is not suitable for display of hand-held device. Meanwhile, in the case of the reflection type, a reflector is arranged at the rear surface of panel, while external light such as the natural light is incident to the front side and an image can also be observed from the front side by utilizing the reflected light thereof. Since the light source for lighting the rear surface is not used different from the transmission type, the reflection type display apparatus consumes less amount of electrical power in comparison with the transmission type and therefore it is suitable for display of a hand-held device.

In the reflection type display apparatus, display is realized by utilizing the incident light from the peripheral environment, it is essential to aim at improvement of brightness by effectively utilizing the incident light. Moreover, it is basically required to realize diffusing reflection of the incident light in the panel in order to realize the white display called as so-called paper white. Therefore, the reflection type display apparatus of the related art comprises in many cases a diffusing reflection layer within the panel. This diffusing reflection layer has the surface including fine unevenness and also has the characteristic approximated to the perfect diffusion in order to show the external appearance of paper white as much as possible. However, it is difficult to conclude that the reflection characteristic is sufficient for practical use and it has been considered a problem of the reflection-type display apparatus of the related art to improve the condition of unevenness from the stages of design and process in view of improving the reflection characteristic thereof.

SUMMARY OF THE INVENTION

The present invention is provided with the following means for solving the problems of the related art and attaining the objects. Namely, according to the present invention, a diffusing reflector can be produced by the following processes.

In the first process, a resin film having photosensitivity is formed on a substrate. In the next process, the resin film is patterned by the photolithography to provide a gathering of pillar-shaped bodies isolated each other. Subsequently, in the next process, heat treatment is performed to allow gentle deformation of individual pillar-shaped bodies in order to form the layer having uneven surface with the maximum inclination angle under 12°. As the final process, a metal film is formed on the gently modified uneven layer. It is preferable to include the process in which the gently modified uneven surface layer is coated with resin to ease the maximum inclination angle by burying the flat opening between individual pillar-shaped bodies isolated each other. Preferably, individual pillar-shaped bodies are gently modified by conducting the heat treatment at the temperature of about 220° C. Preferably, the resin film is divided by the patterning through the photolithography to provide a gathering of polygonal pillar-shaped bodies isolated each other. It is also preferable that the resin film is divided by the patterning so that the size of gap between polygonal pillar-shaped bodies isolated each other becomes almost equal to the minimum resolution of the photolithography.

The present invention includes a structure itself of the diffusing reflector. Namely, the diffusing reflector of the present invention is composed of a resin film forming the heaping areas and a metal film formed on the surface of such heaping areas. Namely, the present invention is characterized in that the heaping areas in which the maximum inclination angle is controlled under 12° are formed through reflow of the resin film composed of gathering of pillar-shaped bodies patterned each other previously leaving the opening between such pillar-shaped bodies.

The diffusing reflector produced by the method explained above can be comprised within the reflection type display apparatus. In this case, the reflection type display apparatus is provided, as the basic structure, with a first transparent substrate arranged in the incident side, a second substrate joined with the first substrate via the predetermined gap and is arranged in the opposite side, an electro-optical layer located in the first substrate side within the gap, a diffusing reflection layer located in the second substrate side within the gap and an electrode for impressing a voltage to the electro-optical layer formed in at least one substrate among the first and second substrates. The diffusing reflection layer is composed of a resin film forming the heaping areas and a metal film formed on the heaping areas. As the characteristic of such reflection type display apparatus, the heaping areas in which the maximum inclination angle is controlled under 12° is formed by reflow of the resin film consisting of gathering of pillar-shaped bodies divided through the patterning keeping the predetermined opening between pillar-shaped bodies. Preferably, the gentle heaping areas are formed by reflow of resin film consisting of gathering of the pillar-shaped bodies and then burying the opening with the other resin film. It is preferable that the opening left after the reflow of the resin film consisting of gathering of pillar-shaped bodies is buried with the other resin to form the uneven surface having the gentle rolling. In the preferred embodiment of the reflection type display apparatus having such structure, a polarizing plate is arranged in the first substrate side and the liquid crystal layer which functions as the (¼)-wavelength plate depending on the voltage impressing condition is used as the electro-optical layer. In this case, the (¼)-wavelength plate is arranged between the polarizing plate and liquid crystal layer and the liquid crystal layer is composed of the nematic liquid crystal layer having positive dielectric anisotropy and the twisted alignment. This liquid crystal layer functions as the (¼)-wavelength plate when a voltage is not applied and also loses the function of the (¼)-wavelength plate when a voltage is applied.

According to the present invention, in view of improving the reflection characteristic of a diffusing reflector, the inclination angle of the layer having uneven surface is optimized. Namely, the reflection characteristic of the diffusing reflector can be improved by controlling the maximum inclination angle to 12° or under. In general, when the maximum inclination angle becomes larger, angular distribution of reflected light beam is widened. When the maximum inclination angle is under 12° and particularly located near 10°, the diagonally incident external light increases in the element to be reflected to an observer located at the front side of apparatus. Therefore, it has been proved that bright image can be obtained. When the maximum inclination angle becomes larger than 12°, the element of reflected light totally reflected in the panel increases. Therefore such maximum inclination angle is not preferable.

BRIEF DESCRIPTION OF THE DRAWINGS

FIG. 4 is a graph showing distribution of inclination angle of the uneven surface layer of the diffusing reflector manufactured by the method of the present invention;

FIG. 5 is a schematic diagram illustrating a measuring system to simulate the reflection characteristic of the diffusing reflector manufactured by the present invention;

FIG. 10 is a graph showing the simulation result;

FIG. 11 is a graph showing the simulation result;

FIG. 13 is a diagram for explaining operations of the reflection type display apparatus illustrated in FIG. 12.

DESCRIPTION OF THE PREFERRED EMBODIMENTS

Figure 1A:
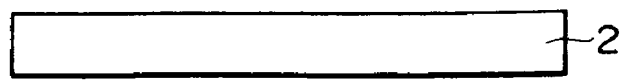
FIGS. 1A to 1E are process diagrams illustrating a manufacturing method of the diffusion reflector of the present invention.

A preferred embodiment of the present invention will be explained in detail with reference to the accompanying drawings. FIGS. 1A to 1E are process diagrams illustrating a method of manufacturing a diffusing reflector of the present invention. As illustrated in FIG. 1A, a substrate 2, for example, consisting of glass material or the like is prepared.

Figure 1B:
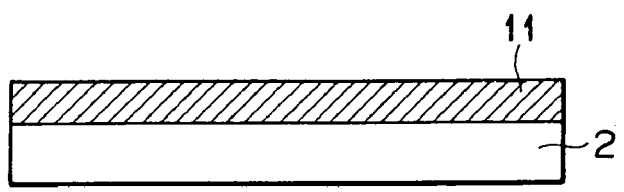
Figure 1C:
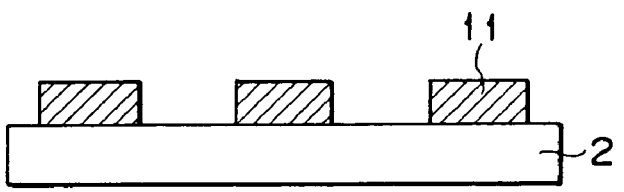
Figure 1D:
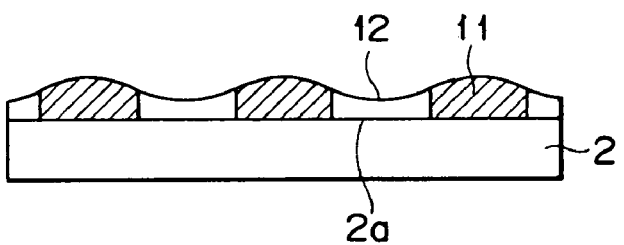
Figure 1E:
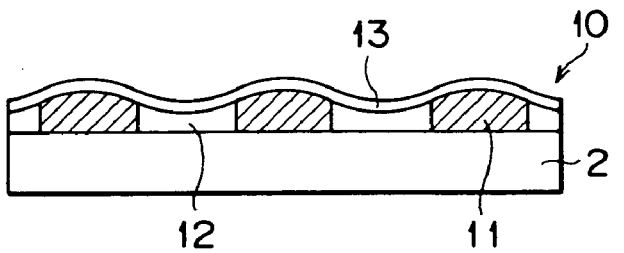

Next, as illustrated in FIG. 1B, a resin film 11 having photosensitivity is formed on the substrate 2. As a resin film 11, a photoresist, for example, may be used. In this embodiment, a film is formed in the thickness of about 1.0 μm by coating of photoresist with the spin coating method. Next, in the process (1C), a gathering of pillar-shaped bodies isolated each other is provided by patterning the resin film 11 with the photolithography. In the photolithography method, exposing process is conducted through irradiation of ultraviolet ray and thereafter the developing process is performed. Adequate irradiation energy of ultraviolet ray is ranged from 150 mJ to 250 mJ. When irradiation energy is less than 150 mJ, the energy is too low and when it exceeds 250 mJ, the energy is too high, and thereby side etching may be generated. Subsequently, in the process (1D), individual pillar-shaped bodies are gently deformed through the heat treatment and thereby the layer having uneven surface having the maximum inclination angle under 12° may be formed. This reflow process is performed, for example, at about 220° C. Namely, the pillar-shaped bodies are heated up to the temperature higher than the softening point or melting point of the resin film 11 and thereby the resin film 11 patterned on the pillar-shaped bodies is once fused and the pillar-shaped bodies are gently deformed through the effect of surface tension. Particularly, the upper end portion of the pillar-shaped body is gently deformed and the angular area is eliminated to provide the desired sloping surface. Moreover, the other resin layer 12 consisting, for example, of photoresist, is coated on the gently deformed uneven surface layer and the flat opening 2a between pillar-shaped bodies isolated each other is buried to ease the maximum inclination angle. Therefore, since the flat area is eliminated from the uneven surface layer formed on the surface of substrate 2, there is no fear for generation of mirror-surface reflection. Reflection brightness of the diffusing reflector observed from the front surface direction can be improved by suppressing mirror-surface reflection. This resin 12 is coated in the thickness, for example, of about 500 nm. This resin 12 should preferably have photo-sensitivity. When the resin 12 has the photosensitivity, the resin 12 may be patterned in the post-process and various processes may be performed when the diffusing reflector is comprised in the panel. Finally, in the process (1E), the metal film 13 can be formed on the gently deformed uneven surface having the eased maximum inclination angle. Therefore, a diffusing layer 10 consisting of the resin film 11 and the metal film 13 laid over the resin film can be formed. The diffusing reflector 10 has a structure that a diffusing reflection layer 10 is formed on the substrate 2. The metal film 13 is formed by depositing a metal material, for example, such as aluminum, silver or the like on the substrate 2 by the sputtering or vacuum evaporation.

Figure 2:
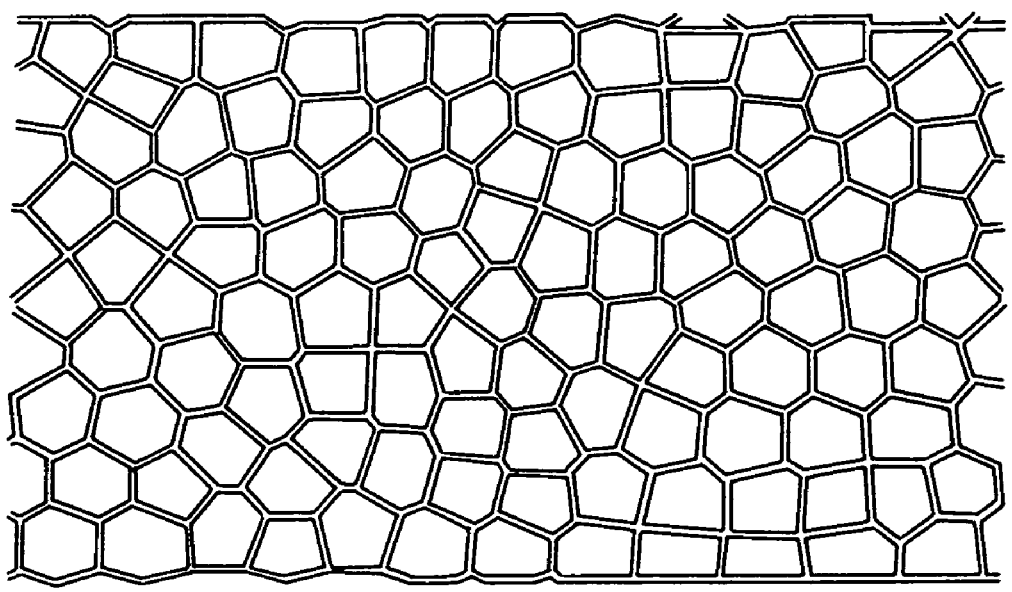
FIG. 2 is a plan view illustrating a pattern of gathering of pillar-shaped bodies formed on the diffusing reflector.

FIG. 2 is a schematic plan view illustrating pillar-shaped bodies isolated each other by patterning the resin film with the photolithography. In this embodiment, gathering of polygonal pillar-shaped bodies isolated each other by the divisional patterning of the resin with the photolithography is provided. The divisional patterning of resin film is conducted in such a manner that size of gap between the polygonal pillar-shaped bodies isolated each other becomes almost equal to the minimum resolution of photolithography. In order to improve reflection characteristic of the diffusing reflector, the pattern having uneven layer is important as well as the maximum inclination angle of the uneven surface layer. Namely, a pillar-shaped body having the uneven surface layer as the unit shape of the diffusing reflector is determined in its shape by the mask pattern to be used for the photolithography. High density of uneven layer is essential for improvement of brightness of the diffusing reflector. Focusing on this point, the unit shape of the uneven surface layer to be depicted on the mask pattern is determined as polygonal shape in the present invention and thereby the uneven layer of the diffusing reflector is formed in higher density.

Figure 3:
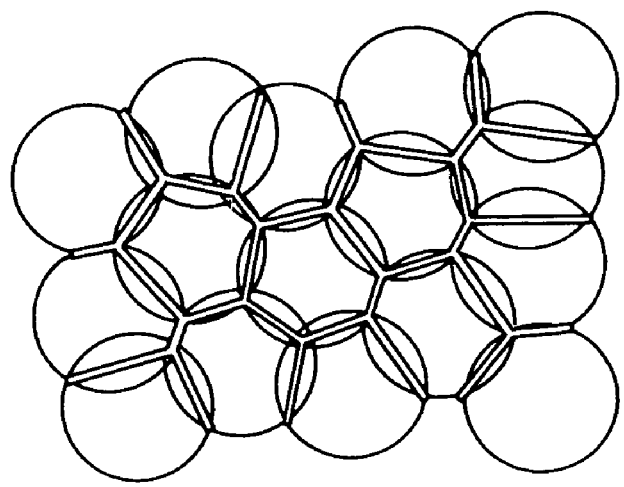
FIG. 3 is a schematic diagram illustrating a pattern design method illustrated in FIG. 2.

FIG. 3 is a schematic diagram illustrating an example of a mask pattern design method. As illustrated in the figure, circles in diameter of 11 μm, for example, are drawn to be in contact with each other. Next, boundaries of the circles in contact condition are connected continuously with straight lines and are then isolated each other. The isolated boundary width for isolation, namely the size of gap between neighboring polygonal pillar-shaped bodies is set to about 1 μm which is almost equal to the minimum resolution of the photolithography process. Diameter of the basic circle is 11 μm in average and size of gap between the polygonal pillar-shaped bodies obtained is 1 μm. Even when the density of mask pattern is changed, rise of density of polygons results in, on the contrary, increase of the maximum inclination angle because the minimum value of the distance between the neighboring polygonal patterns is determined by the resolution. In order to obtain the good reflection characteristic, it is essential to control the maximum inclination angle to a value under 12°. Particularly, the preferable angle is about 10°. It has been proved by experiments that the maximum inclination angle can be obtained by setting the diameter of unit circle to about 11 μm and the size of gap between the neighboring polygons to 1 μm which is almost equal to the minimum resolution of the photolithography.

Optimization of the inclination angle of the uneven surface layer can be controlled not only by mask pattern design but also by the process. As explained above, the photoresist is coated by the spinning method in the thickness, for example, of 1.0 μm and it is then exposed and then developed by the irradiation energy of 150 mJ or more using the mask illustrated in FIG. 2. Here, heat treatment is performed for an hour under the temperature of 220° C. for the purpose of reflow. Thereafter, the resin consisting, for example, of photoresist is spin-coated in the thickness of about 500 nm. After the baking, metal aluminum or silver, for example, is sputtered in the thickness of 400 or 500 nm.

Angular distribution of the diffusing reflector obtained under the conditions explained above is shown in FIG. 4. The graph of FIG. 4 shows the distribution of inclination angles of the uneven surface layers of a couple of samples indicated by black circle and black square. In any sample, the inclination angles are distributed under 12° and it can be understood that the maximum inclination angle of the uneven surface layer can be controlled to a value under 12°.

As explained above, according to the present invention, the maximum inclination angle of the uneven surface layer is controlled to the angle under 12° in order to improve the reflection characteristic of the diffusing reflector by improving manufacturing process and mask pattern. As will be explained below, the diffusing reflector just suitable for the reflection type display apparatus can be attained by controlling the maximum inclination angle to 12° or preferably to about 10°. It is an effect of simulation. FIG. 5 illustrates the direction of an observer set in the simulation. Considering the actual application environment, it is assumed that the external lighting beam is incident from the upper direction of panel in the incident angle of 30° for the normal line and an observer is looking at the panel 0 along the normal line. The panel 0 has a flat structure holding the liquid crystal layer 3, for example, as the electro-optical layer between a couple of substrates 1, 2.

Figure 6:
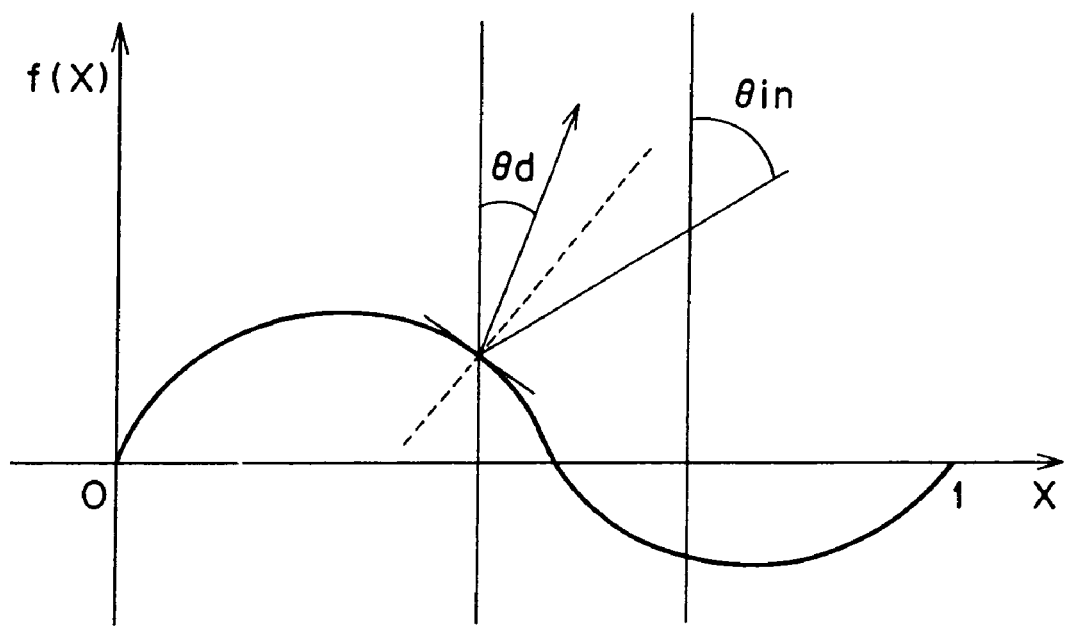
FIG. 6 is a graph showing the sine wave used in the simulation of the diffusing reflector of the present invention.

As shown in FIG. 6, as a precondition of simulation, the sectional shape of the uneven surface of the diffusing reflector is approximated by the trigonometric function and its only one period is considered here. When wavelength of trigonometric function is kept constant and amplitude is changed, the differential coefficient reflecting the inclination angle is naturally varied and the maximum value of its absolute value can be obtained as $\theta=0.2\pi$, for example, in the case of sine wave. It is assumed that the inside of panel is filled with liquid crystal, such inclination angle as not generating multiple-scattering is considered and moreover the incident angle of light is set to 27° or 33° corresponding to the actual light source of the measuring system. Here, reflection angle $\theta d$ observed from the normal line direction is considered in such a case that the light is incident to the uneven pattern of which sectional view is indicated by the sine wave as shown in FIG. 6. A profile of the sectional view of the uneven surface is defined, for example, as $f(x)=R \cdot \sin 2\pi x$. When considering refraction of the liquid crystal layer, it is enough to process the incident angle $\theta$ in of the lighting beam in the range of $\pm 42°$ for the normal line direction and the amplitude condition for such range can be attained as $R=0.177$ or less by the brief calculation. The reflection angle $\theta d$ in this system is given as $\theta d=\pi/2-\theta in+\arctan(2\pi R \cdot \cos 2\pi x)$. Here, x changes in the range from 0 to 1. X is plotted in the graduation of 0.01 and the incident angle range of incident light beam is taken in the range from 68.7° to 72.4°, considering the refraction of liquid crystal. The distribution of angle $\theta d$ (degree) when R is changed as a parameter under this condition is shown by the graphs of FIG. 7 to FIG. 11. In these graphs, the maximum inclination angle is indicted as a parameter in place of the value of R for easier understanding.

Figure 7:
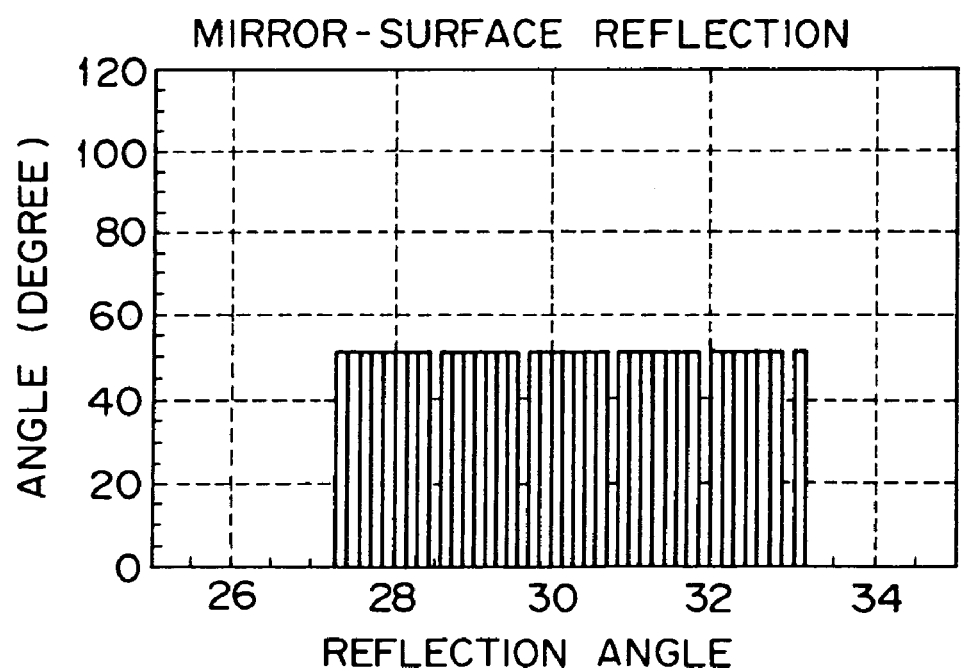
FIG. 7 is a graph showing the simulation result.
Figure 8:
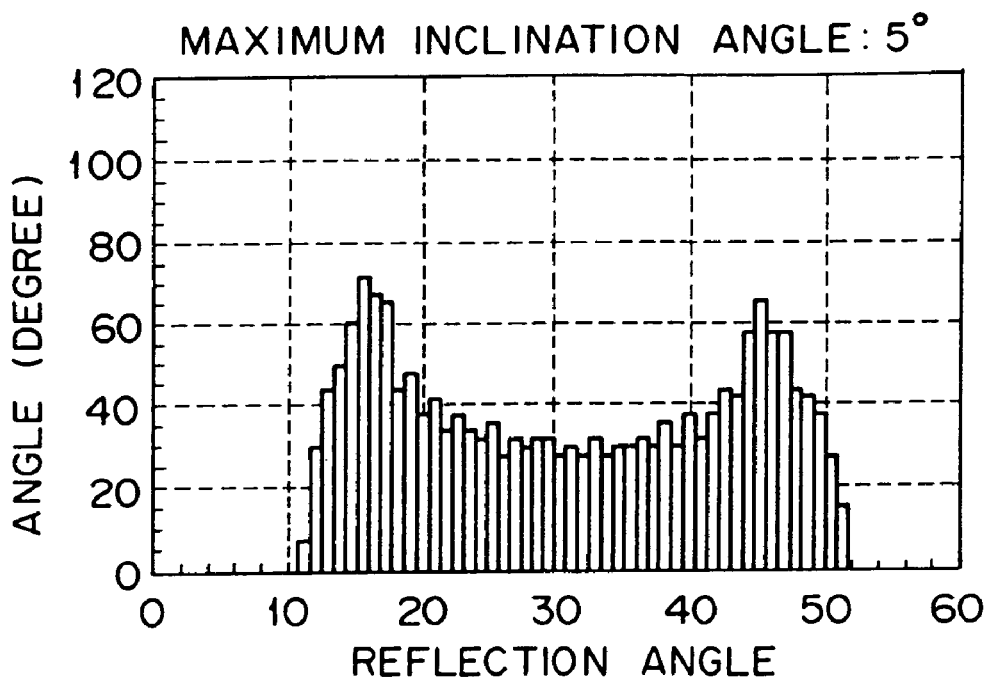
FIG. 8 is a graph showing the simulation result.
Figure 9:
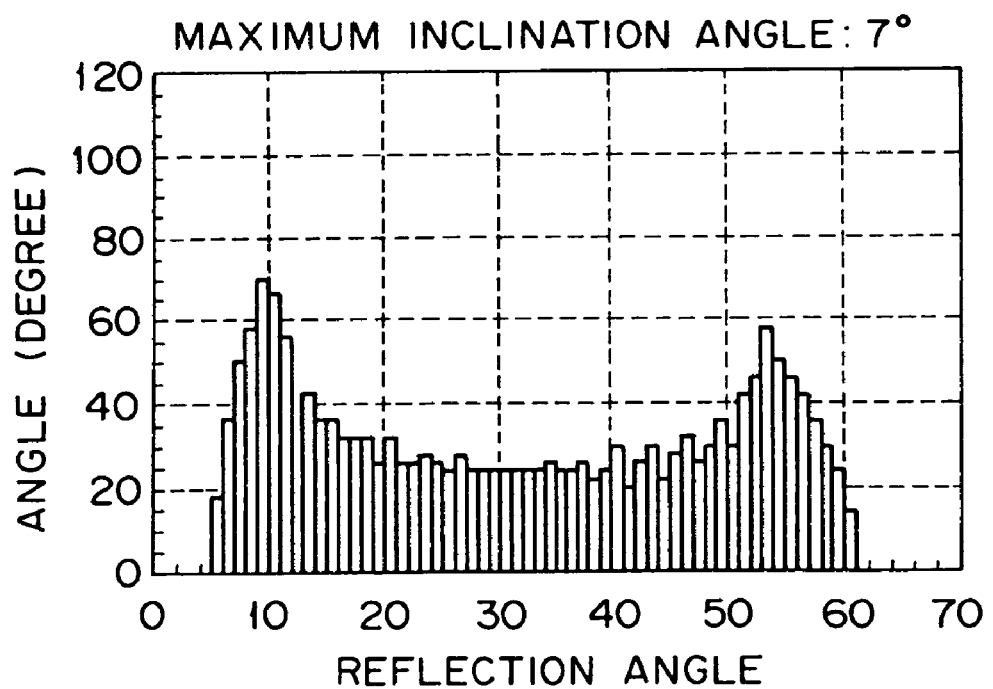
FIG. 9 is a graph showing the simulation result.

FIG. 7 shows the data of mirror-surface reflection. The distribution of reflection angle (Degree) shows the flat maximums between 27° and 33° indicating extremely stronger directivity. FIG. 8 shows distribution of reflection angle when the maximum inclination angle is 5°. Peaks are generated at the reflection angles of about 15° and 45°. FIG. 9 shows the data when the maximum inclination angle is 7°. The reflection angle is scattered to 60° from 10°. FIG. 10 shows the data when the maximum inclination angle is 10° and the higher peak is appearing at the reflection angle of 0°. Namely, the diagonal incident light deviated from the normal line direction is reflected in the direction of front surface to reach an observer. Thereby, bright display can be obtained. FIG. 11 shows the data when the maximum inclination angle is 12°. As is apparent from the above graphs, when the maximum inclination angle becomes larger, angular distribution of the reflected light is widened, but these graphs suggest that when the maximum inclination angle is 10°, the light bean is reflected most effectively toward an observer. When the maximum inclination angle is 12° or larger, a large amount of light beam is reflected totally at the boundary of the substrate 1 in the opposite side and the liquid crystal layer 3. Based on the above simulation, the maximum inclination angle of the uneven surface layer of the present invention is set under 12° and preferably to the angle of about 10°.

Figure 12:
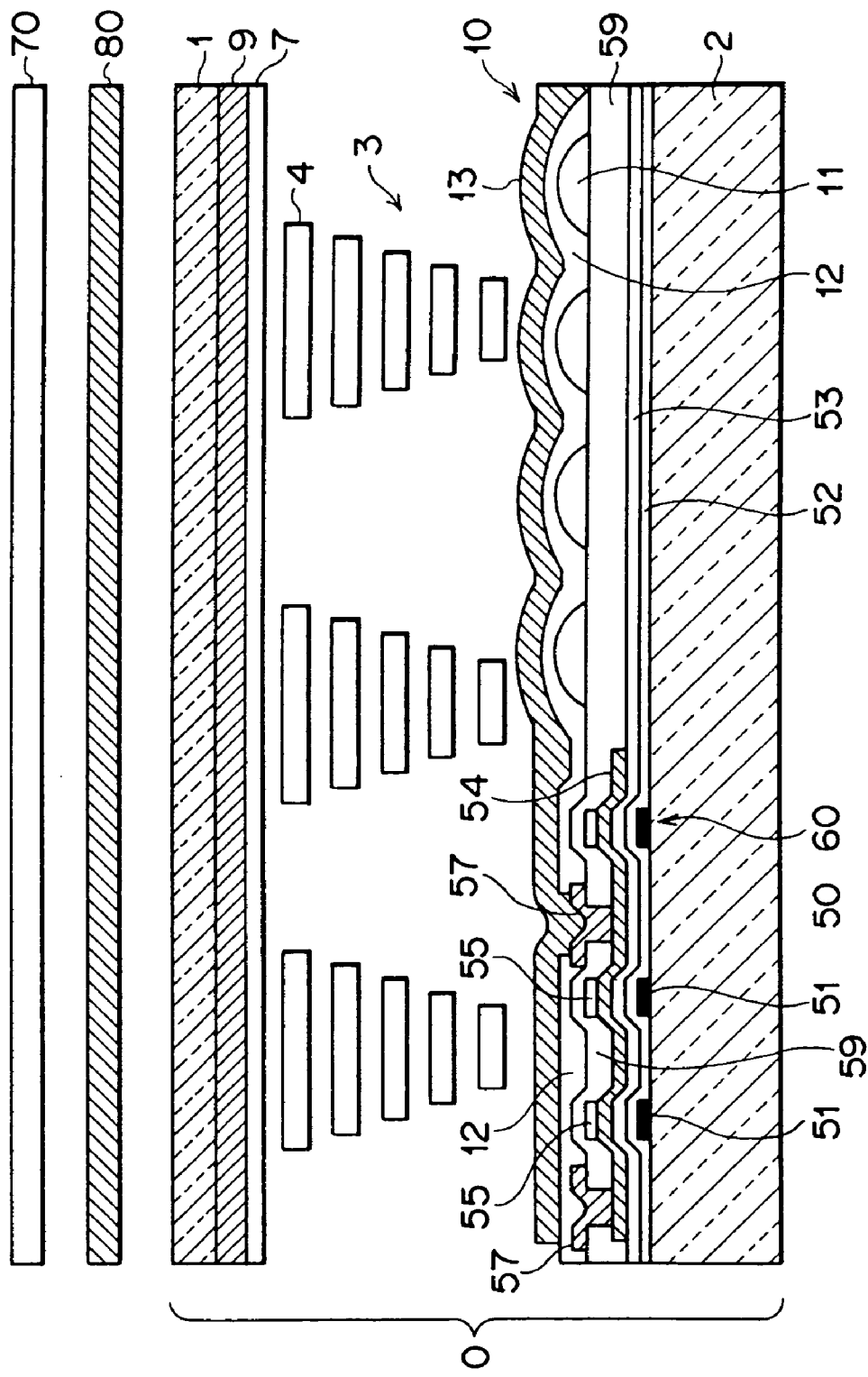
FIG. 12 is a schematic partial sectional view illustrating a preferred embodiment of the reflection type display apparatus comprising the diffusing reflector manufactured by the present invention.

FIG. 12 is a schematic partial sectional view illustrating a practical example of the reflection type display apparatus of the present invention. In this example, TN-ECB (Twist Nematic-Electrically Controlled Birefringence) mode liquid crystal panel 0 is used. As is illustrated, a polarizing plate 70, for example, of polymer film having optical anisotropy and a (¼)-wavelength plate 80 are arranged at the surface of the panel 0 of the reflection type display apparatus of the present invention. The panel 0 is formed by joining a first substrate 1 consisting, for example, of the transparent glass plate located at the incident side of the external light beam and a second substrate 2, for example, consisting of glass plate located at the opposite side via the predetermined gap. At the gap between both substrates 1, 2, the nematic liquid crystal layer 3, for example, is held as the electro-optical layer. The liquid crystal molecules 4 are provided under the twisted alignment by the upper and lower alignment films (not illustrated), for example, consisting of polyimide. Electrodes consisting, for example, of ITO are respectively formed at the internal surfaces of the substrates 1, 2 to apply the voltage to the nematic liquid crystal layer 3 in every pixel. This embodiment is so-called an active matrix type in which an opposite electrode 7 is formed in the side of the first substrate 1, while a pixel electrode (13) is formed in the side of the second substrate 2. The pixel electrode is driven by a switching element consisting of a thin film transistor 50 composed, for example, of polysilicon. The opposite electrode 7 and pixel electrode are provided opposed with each other, defining pixels between these electrodes. At the internal surface of the second substrate 2 located in the opposite side, the diffusing reflection layer 10 is formed depending on the present invention. The diffusing reflection layer 10 is composed of the stacked layer of resin films 11, 12 and metal film 13. In this embodiment, the metal film 12 is also working as the pixel electrode. The reflection type display apparatus of the structure explained above is of the TN-ECB system in the normally white mode. Namely, when no voltage is applied, the nematic liquid crystal layer 3 functions as the (¼)-wavelength plate by maintaining the twisted alignment and performs white display by allowing the external light beam to pass in cooperation with the polarizing plate 70 and the (¼)-wavelength plate 80. When the voltage is applied, the nematic liquid crystal layer 3 shifts to the vertical alignment and loses the function as the (¼)-wavelength plate and performs black display by shielding the external light beam in cooperation with the polarizing plate 70 and (¼)-wavelength plate 80.

Subsequently, referring to FIG. 12, each structural element will be explained below. As is already explained above, a polarizing plate 70 is arranged at the surface of the first substrate 1 of the panel 0. Moreover, the (¼)-wavelength plate 80 is also provided between the polarizing plate 70 and first substrate 1. This (¼)-wavelength plate 80 is formed, for example, of a polymer film of which one axis is extended in order to give a phase difference as much as (¼)-wavelength between the normal light beam and irregular light beam. An optical axis of the (¼)-wavelength plate 80 is arranged to form the angle of 45° for the polarizing axis (transmitting axis) of the polarizing plate 70. The external light beam passes the polarizing plate 70 to become the linearly polarized light beam. The linearly polarized light beam passes the (¼)-wavelength plate 80 to become the circularly polarized light beam. Moreover, when this light beam passes again the (¼)-wavelength plate, it is converted to the linearly polarized light beam. In this case, polarizing direction is rotated for 90° from the original polarizing direction. As explained above, the (¼)-wavelength plate can rotate the polarizing direction in combination with the polarizing plate and uses this process for the display function.

The panel 0 basically uses; as the electro-optical layer, the nematic liquid crystal layer 3 consisting of the nematic liquid crystal molecule 4 having horizontally aligned positive dielectric anisotropy. This nematic liquid crystal layer 3 functions as he (¼)-wavelength plate by setting its thickness to adequate value. In this embodiment, the nematic liquid crystal layer 3 has the refractive index anisotropy $\Delta n$ of about 0.7 and thickness of the nematic liquid crystal layer 3 is about 3 μm. Therefore, retardation $\Delta n \cdot d$ of the nematic liquid crystal layer 3 becomes 0.2 to 0.25 μm. As is illustrated in the figure, since the nematic liquid crystal molecule 4 is provided through the twisted alignment, a substantial value of the retardation becomes about 0.15 μm (150 nm). This value is almost equal to ¼ of the center wavelength (about 600 nm) of the external light beam and thereby the nematic liquid crystal layer 3 is capable of optically functioning as the (¼)-wavelength plate. The wanted twisted alignment can be attained by holding the nematic liquid crystal layer 3 with the upper and lower alignment films. In the side of the first substrate 1, the liquid crystal molecule 4 is provided on the line along the rubbing direction of the aligned film and the liquid crystal molecule 4 is also provided on the line along the rubbing direction of the aligned film also in the side of the second substrate 2. The wanted twisted alignment can be attained by shifting the rubbing direction of the upper and lower aligned films as much as 60° to 70°.

A color filter 9 is formed in the side of the transparent first substrate 1 consisting, for example, of negative resist in which pigment is dispersed. Meanwhile, a diffusing reflection layer 10 is formed in the side of the second substrate located in the reflecting side. The diffusing reflection layer 10 is provided with the uneven surface layer having the light scattering characteristic. Therefore, this layer shows the external appearance of paper white and accordingly not only it is suitable for display of background but also the viewing angle is widened to assure easy display and brightness of display increases in the wider viewing range. As is illustrated in the figure, the diffusing reflection layer 10 is composed of resin films 11, 12 forming gentle heaping areas and the metal film 13 formed on the surfaces thereof. As is explained previously, the metal film 13 is also working as the pixel electrode. The diffusion reflection layer 10 is formed conforming to the present invention and is provided with the uneven surface layer having the gentle heaping areas by the reflow of resin film 11 consisting of gathering of pillar-shaped bodies previously and discretely patterned leaving the opening. Moreover, the opening being left is buried with the other resin film 12 after the reflow of the resin film 11 consisting of the gathering of the pillar-shaped bodies. The maximum inclination angle of the uneven surface layer is controlled to the angle under 12°.

A thin film transistor 50 for driving the pixel electrode is integrated and formed on the surface of the second substrate 2. The thin film transistor 50 has a bottom gate structure in the stacking structure in which the gate electrode 51 consisting, for example, of Mo, double-layer gate insulating films 52, 53 consisting, for example, of $SiO_2$ and SiN, and semiconductor thin film 54 consisting, for example, of polycrystalline silicon are sequentially stacked from the lower side. The thin film transistor has the double-gate structure including a couple of gate electrodes 51. A channel area is provided in the area of the semiconductor thin film 54 located just on each gate electrode 51. Each channel area is protected by a stopper 55. An auxiliary capacitance 60 is also formed in the same layer structure as this thin film transistor 50. The thin film transistor 50 and auxiliary capacitance 60 having the structure explained above are covered with an interlayer insulating film 59 consisting, for example, of PSG. On the interlayer insulating film 59, a contact hole communicating with the source area and drain area of the thin film transistor is opened. On this interlayer insulating film 59, a wiring 57 consisting, for example, of Al is formed and is connected to the source area and drain area of the thin film transistor 50 via the contact hole. The wiring 57 is covered with the resin film 12 explained above. Moreover, the pixel electrode (13) explained above is patterned. The pixel electrode is electrically connected to the drain area of the thin film transistor 50 via the contact hole opened to the resin film 12 and the wiring 57.

Referring to FIG. 13, operations of the reflection type display apparatus illustrated in FIG. 12 will be explained. In this figure, (OFF) indicates the condition in which a voltage is not applied and (ON), the condition in which a voltage is being applied. As illustrated in the condition (OFF), the reflection type display apparatus of the present invention is formed by sequentially stacking the polarizing plate 70, (¼)-wavelength plate 80, nematic liquid crystal layer 3 and diffusing reflection layer 10 from the observer side. The polarizing axis (transmission axis) of the polarizing plate 70 is defined as 70P. The optical axis 80S of the (¼)-wavelength plate 80 is forming the angle of 45° for the transmission axis 70P. Moreover, the alignment direction 3R of the liquid crystal molecule 4 in the side of first substrate is parallel to the polarizing axis (transmission axis) 70P of the polarizing plate 70.

The incident light 201 is converted to the linearly polarized light 202 when it passes through the polarizing plate 70. The polarizing direction is parallel to the transmission axis 70P and such polarization is hereinafter called the parallel linear polarization. The parallel linearly polarized light 202 is then converted to the circularly polarized light 203 when it passes through the (¼)-wavelength plate 80. The circularly polarized light 203 is then converted to the linearly polarized light when it passes through the nematic liquid crystal layer 3 functioning as the (¼)-wavelength plate. However, the polarizing direction of the linearly polarized light rotates for 90° to orthogonally cross the parallel linearly polarized light 202. Hereinafter, this polarization is hereinafter called the orthogonal linear polarization. The orthogonal linear polarized light 203 is reflected by the diffusing reflection layer 10 and passes again the nematic liquid crystal layer 3 functioning as the (¼)-wavelength plate to become the circularly polarized light 20-4. The circularly polarized light 204 passes moreover the (¼)-wavelength plate 80 and thereby it is converted to the original parallel linearly polarized beam 205. This parallel linearly polarized light 205 passes the polarizing plate 70 and then reaches the observer as the output light 206 resulting in white display.

In the condition (ON) where a voltage is being applied, the liquid crystal molecule 4 is shifted to the vertical alignment from the twisted alignment, losing the function as the (¼)-wavelength plate. The external light 201 having passed the polarizing plate 70 is converted to the parallel linearly polarized light 202. The parallel linearly polarized light 202 is converted to the circularly polarized light 203 when it passes through the (¼)-wavelength plate 80. The circularly polarized light 203 passes in direct through the nematic liquid crystal layer 3 and is then reflected by the diffusing reflection layer 10 and then reaches the (¼)-wavelength plate 80 as the circularly polarized light 204*a*. Here, the circularly polarized light 204*a* is converted to the orthogonal linearly polarized light 205*a*. The orthogonal linearly polarized light 205*a* cannot pass through the polarizing plate 70, resulting in black display.

According to the present invention, the diffusing reflector can be manufactured by the processes of forming a resin film having photosensitivity on a substrate, providing gathering of pillar-shaped bodies isolated each other by the patterning of resin film with photolithography, forming layer having the uneven surface with the maximum inclination angle under 12° by gently deforming individual pillar-shaped bodies through the heat treatment and forming a metal film on the gently deformed uneven surface layer. The reflection brightness observed from the front surface can be improved and the optimum design to improve display quality can be realized by comprising such diffusing reflector into the reflection type display apparatus

What is claimed is:

1. A method of manufacturing a diffusing reflector comprising the processes of:
   preparing a substrate;
   forming a first resin film having photosensitivity on said substrate;
   providing a gathering of adjacent pillar-shaped bodies isolated from each other through patterning of said resin film with photolithography;
   deforming gently said adjacent pillar-shaped bodies through a reflow;
   forming an uneven surface layer having the maximum inclination angle of under 120 by coating with a thin layer of a second resin said gently deformed pillar-shaped bodies;
   covering with the second resin open flat spaces located between said isolated adjacent pillar-shaped bodies to form one concave gap between any two adjacent isolated pillar-shaped bodies so that upper end portions of said any two adjacent isolated pillar-shaped bodies are higher than a lower end portion of said one concave gap in the thickness direction of the diffusing reflector, thereby minimizing an occurrence of a flat surface area on said substrate; and
   forming a metal film on said uneven surface layer,
   wherein,
   said first resin film is patterned by straight connected lines that form a continuous polygonal pattern, said straight connected lines providing a continuous and substantially uniform gap between any two of said adjacent polygonal pillar-shaped bodies thereby forming a rectilinear honeycomb-like pattern,
   said gap is substantially constant throughout the honeycomb-like pattern and has a size equal to about a minimum resolution of said photolithography, and
   a thickness of the second resin is about 500 nm.

2. The method of manufacturing a diffusing reflector as claimed in claim 1, wherein said maximum inclination angle is about 10°.

3. The method of manufacturing a diffusing reflector as claimed in claim 1, wherein said reflow process is a heat treatment under the temperature of about 220° C.

4. The method of manufacturing a diffusing reflector as claimed in claim 1, wherein gathering of polygonal pillar-shaped bodies isolated from each other by the divided patterning of said first resin film by said photolithography is provided.

* * * * *